A. MURATORI.
ELECTRICAL MEASURING INSTRUMENT.
APPLICATION FILED DEC. 9, 1916.
1,392,199. Patented Sept. 27, 1921.
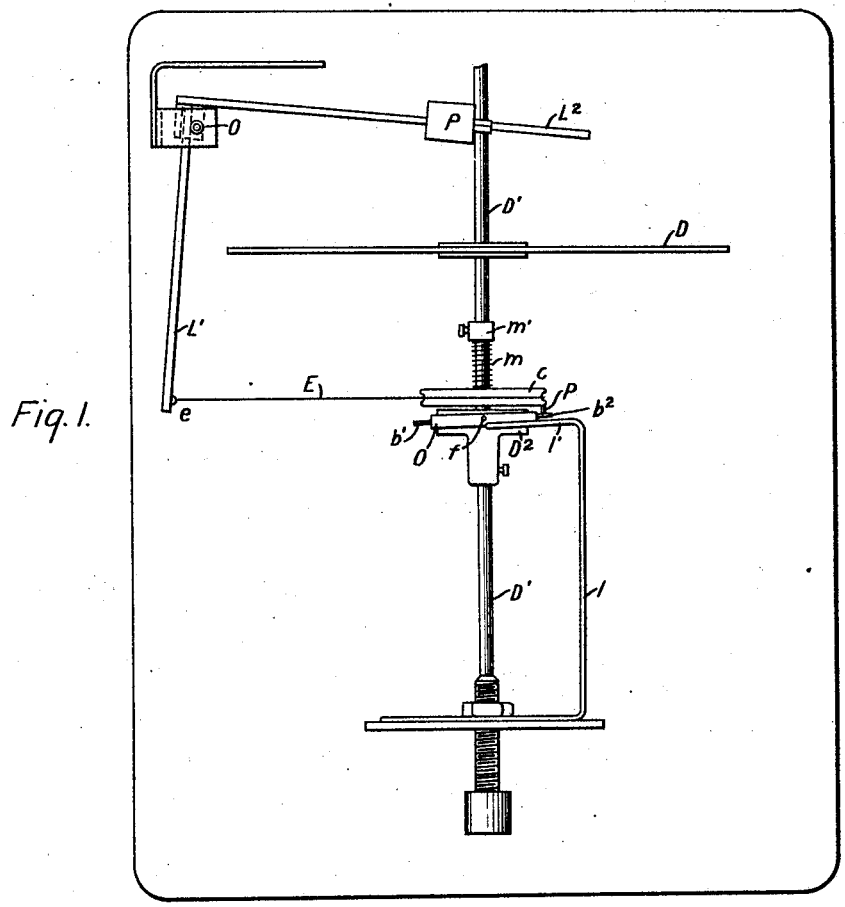
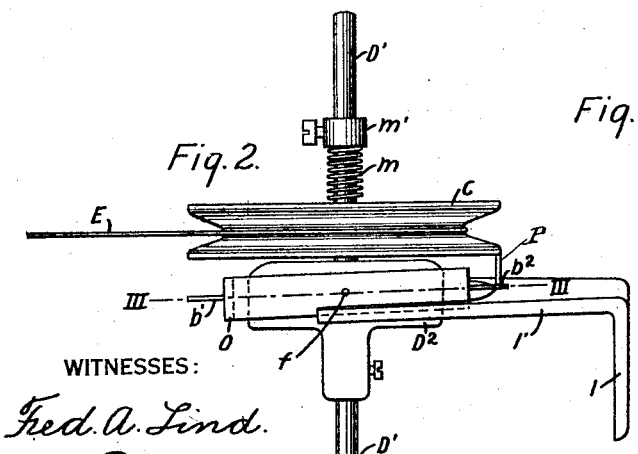
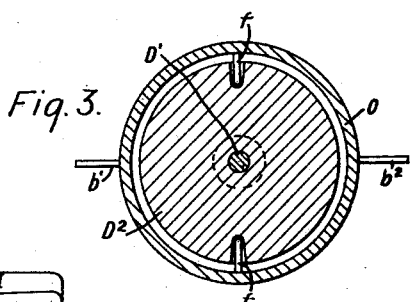
INVENTOR
Alfredo Muratori

UNITED STATES PATENT OFFICE.

ALFREDO MURATORI, OF ROME, ITALY, ASSIGNOR TO THE BRITISH WESTINGHOUSE ELECTRIC AND MANUFACTURING COMPANY LIMITED, A CORPORATION OF GREAT BRITAIN.

ELECTRICAL MEASURING INSTRUMENT.

1,392,199. Specification of Letters Patent. Patented Sept. 27, 1921.

Application filed December 9, 1916. Serial No. 136,061.

*To all whom it may concern:*

Be it known that I, ALFREDO MURATORI, a subject of the King of Italy, and a resident of Rome, Italy, have invented a new and useful Improvement in Electrical Measuring Instruments, of which the following is a specification.

This invention relates to electric meters and has for its object to construct an improved device which can be applied to a meter of the motor type for the purpose of rendering it suitable for use on systems where the consumer is charged under a differential tariff.

According to the invention a retarding torque is applied to the meter spindle by means of a weight which is capable of adjustment along a pivoted arm, the moment of the weight about the pivot determining the torque above which the meter begins to register. The torque of the meter is proportional to the power used in the consumption circuit and when this torque exceeds the retarding torque imposed by the weight, the meter will commence to rotate under the differential action of the two torques. The meter, therefore, registers the excess energy consumed only at those times when the power used exceeds the predetermined limit.

The invention is illustrated in the accompanying drawings, in which Figure 1 illustrates a portion of a meter mechanism, having applied to it a device constructed according to the present invention. Fig. 2 shows a part of Fig. 1 drawn to an enlarged scale, and Fig. 3 is a section on the line III—III of Fig. 2.

Referring now to Fig. 1, the rotary armature or disk of the meter is indicated at D, and the meter spindle on which the disk is secured is shown at D′. P is a weight capable of sliding friction-tight on an arm $L^2$ perpendicular to the arm L′ forming therewith a bell-crank lever pivoted on a fixed pivot O. To the extremity of the arm L′ at the point $e$ is attached a silk cord E, the other end of which is connected to a pulley $c$, which is loosely mounted on the shaft of the meter, but can be alternately driven and released by a device which is more clearly shown in Figs. 2 and 3, and which will now be described.

The pulley $c$ is provided with a downwardly projecting pin $p$. Firmly secured to the meter spindle is a disk $D^2$, to which is pivoted by the pins $f$, $f$ a ring $o$; said ring is provided with two pins $b′$, $b^2$, horizontally projecting therefrom at right angles to the pivotal axis formed by the pins $f$, $f$. The ring $o$ is embraced by a semi-circular crutch $l′$, supported by a fixed arm $l$, the upper surface of said crutch being formed helicoidal or inclined to the horizontal, and in a position to engage the pins $b′$, $b^2$ alternately as the ring $o$ is rotated. The relationship between the parts is such that when one of the pins, $b^2$ for example, reaches the highest point of the inclined surface of the crutch $l′$, the other pin, $b′$, will be in a position to engage the lowest point of said inclined surface. Under these circumstances it is evident that the ring $o$ will be oscillated on the pivots $f$ during its rotation. $m$ is a spring, the upper extremity of which is fixed by the collar $m′$ on the meter spindle, and which is adapted to exert a slight pressure on the pulley $c$, for a purpose hereinafter mentioned.

The operation of the device is as follows: The weight P is normally in the position shown in Fig. 1 and the tension in the cord E exerts a torque on the pulley $c$ which is transmitted by the pin $p$ to one or other of the pins $b′$, $b^2$, with which it is in engagement to the ring $o$ and thence through the disk $D^2$ to the meter spindle. When the meter is energized it tends to rotate in a direction to oppose the torque above mentioned, and before rotation can take place the torque exerted by the meter must be sufficient to overcome the retarding torque due to the action of the weight P. Until this condition arises no movement of the meter occurs and no registration is made. When the power consumption exceeds the predetermined limit the meter torque becomes greater than the retarding torque and the spindle rotates under the differential action of the two torques, its speed being proportional to the difference between them and consequently to the amount by which the power taken by the customer exceeds the predetermined limit. As the meter rotates, the pin $p$ and the pulley $c$ are carried around by the horizontal pin with which it is in engagement, $b^2$ for example as shown in Fig. 1, thereby through the cord E and bell-crank lever L′, $L^2$ raising the weight P. As the rotation continues the other horizontal pin, $b′$ for example, will engage with the helicoidal surface of the crutch $l′$ at its lowest point and is gradually raised by said surface thus oscillating the ring $o$ on the pins $f$ until when said pin $b'$ for example, reaches the highest point of the helicoidal surface, the other pin, $b^2$ for example, has been moved to such an extent in the downward direction as to release the pin $p$. The torque exerted by the tension in the cord E will then rotate the pulley $c$ backward and permit the weight P to drop, until the pin $p$ meets the other horizontal pin, $b'$ for example, whereupon it will be carried around by said pin and the operation will be repeated.

During the short interval in which the pin $p$ is disengaged from the horizontal pins $b'$, $b^2$ and the weight P is falling, the rotor of the meter is free from the retarding torque and thus tends to accelerate in speed. This, however, is compensated for by the shock with which the pin $p$ strikes the horizontal pin $b'$ or $b^2$ when it reëngages.

It will be observed that during the rotation of the meter the moment of the weight P about the center O, and consequently the tension in the cord E will vary, but the angular displacement of the arms $L'$ and $L^2$ being identical, their respective horizontal and vertical projections maintain in all positions the same relative proportions. The retarding torque is, therefore, substantially constant during a complete revolution of the motor.

The spring $m$ is provided to reduce the shock caused by the drop of the weight P, this spring exerting a small pressure on the pulley $c$ so as to produce a braking action during the rotation of said pulley in the reverse direction by the tension in the cord E.

The device constructed as herein described is very simple and can easily be applied to any ordinary standard type of motor meter without modifying the design of the latter. It can easily be adjusted by displacing the weight P along the arm $L^2$, and by graduating the arm $L^2$ the limit of power up to which the meter does not register can be readily adjusted without the use of another meter and even without connecting the meter in circuit. The device can also be readily removed from any meter to which it has been applied and the meter restored to its normal condition.

I claim as my invention:

1. In an excess-demand meter, the combination with a rotatable member, of a single weighted bell-crank lever, a pulley loosely mounted on the rotatable member, means for connecting the lever to the pulley, and means for recurrently connecting the pulley to the rotatable member.

2. The combination with an electric meter of the motor type, of a weighted bell-crank lever, a fixed pivot therefor, a pulley loosely mounted on the meter spindle, a flexible connection between said pulley and one arm of said bell-crank lever, and means for operatively connecting said pulley with said meter spindle, whereby said lever imposes a retarding torque on the meter.

3. In an electric meter of the motor type, a pulley loosely mounted on the meter spindle, means operatively connecting said pulley to the meter spindle when the meter is at rest, and means whereby said operative connection is rendered inoperative during a portion of each revolution of the spindle when the meter is rotating.

4. In an electric meter of the motor type, a pulley loosely mounted on the meter spindle, means for exerting a tangential force on said pulley, a disk carried by the meter spindle, a ring pivoted to said disk, arms projecting from said ring, a pin projecting from said pulley, and means whereby the pin is caused to engage with the arms in succession as the meter rotates.

5. In an electric meter of the motor type, the combination of a pulley loosely mounted on the meter spindle, and having a pin projecting therefrom, means for exerting a tangential force on said pulley, a disk carried by the meter spindle, a ring pivoted to said disk, arms projecting from said ring in a direction perpendicular to the meter axis adapted periodically to engage with the pin projecting from said pulley, and an arm having an inclined surface adapted to engage said former arms in succession as the meter rotates, whereby an oscillation of the ring on its pivots takes place.

6. The combination with an electric meter of the motor type of a weighted bell-crank lever, a fixed pivot therefor, a pulley loosely mounted on the meter spindle and connected to one arm of the bell-crank lever, and means for braking said pulley.

7. In a motor meter, the combination with a rotatable member, of a single weighted bell-crank lever, a pulley loosely mounted on the rotatable member, a flexible means for connecting the lever to the pulley, and means actuated by the rotatable member for so recurrently connecting the pulley to the rotatable member as to cause the lever to impose a substantially constant average retarding force on the rotatable member.

In testimony whereof I have hereunto subscribed my name this sixth day of November, 1916.

ALFREDO MURATORI.

Witnesses:
ERNEST SALVATORI,
JAG GASTON ALBRIGHT.